(12) United States Patent
Muehlenstaedt et al.

(10) Patent No.: US 11,657,591 B2
(45) Date of Patent: May 23, 2023

(54) AUTONOMOUS VEHICLE SYSTEM FOR INTELLIGENT ON-BOARD SELECTION OF DATA FOR BUILDING A REMOTE MACHINE LEARNING MODEL

(71) Applicant: Argo AI, LLC, Pittsburgh, PA (US)

(72) Inventors: Thomas Muehlenstaedt, Bavaria (DE); Jelena Frtunikj, Bavaria (DE); Zach Kurtz, Pittsburgh, PA (US)

(73) Assignee: ARGO AI, LLC, Pittsburgh, PA (US)

( * ) Notice: Subject to any disclaimer, the term of this patent is extended or adjusted under 35 U.S.C. 154(b) by 296 days.

(21) Appl. No.: 17/150,768

(22) Filed: Jan. 15, 2021

(65) Prior Publication Data

US 2022/0230021 A1  Jul. 21, 2022

(51) Int. Cl.
| | |
|---|---|
| *G06N 20/00* | (2019.01) |
| *G06K 9/62* | (2022.01) |
| *G06V 10/20* | (2022.01) |
| *G05D 1/02* | (2020.01) |

(52) U.S. Cl.
CPC ......... *G06V 10/255* (2022.01); *G06K 9/6269* (2013.01); *G06N 20/00* (2019.01); *G05D 1/0221* (2013.01)

(58) Field of Classification Search
None
See application file for complete search history.

(56) References Cited

U.S. PATENT DOCUMENTS

| | | |
|---|---|---|
| 7,793,188 B2 | 9/2010 | Mukhopadhyay et al. |
| 9,031,317 B2 | 5/2015 | Yakubovich et al. |
| 10,379,842 B2 | 8/2019 | Malladi et al. |
| 10,489,222 B2 | 11/2019 | Sathyanarayana et al. |
| 10,499,283 B2 | 12/2019 | Elias et al. |
| 2019/0258904 A1 | 8/2019 | Ma et al. |
| 2020/0005083 A1 | 1/2020 | Collins |
| 2020/0081426 A1 | 3/2020 | Kane et al. |

(Continued)

FOREIGN PATENT DOCUMENTS

CN    111914944 A    11/2020

OTHER PUBLICATIONS

Aussel, N. et al., "Combining federated and active learning for communication-efficient distributed failure prediction in aeronautics" 2019, hal-02446200f, available at https://hal.archives-ouvertes.fr/hal-02446200/document.

(Continued)

*Primary Examiner* — Dov Popovici
(74) *Attorney, Agent, or Firm* — Fox Rothschild LLP (57) ABSTRACT

Systems and methods for on-board selection of data logs for training a machine learning model are provided. The system includes an autonomous vehicle having a plurality of sensors and a processor. The processor receives a plurality of unlabeled images from the plurality of sensors, a machine learning model, and a loss function corresponding to the machine learning model. For each of the plurality of images, the processor then determines one or more predictions using the machine learning model, compute an importance function based on the loss function and the one or more predictions, and transmit that image to a remote server for updating the machine learning model when a value of the importance function is greater than a threshold.

22 Claims, 5 Drawing Sheets

(56) References Cited

U.S. PATENT DOCUMENTS

| | | | | |
|---|---|---|---|---|
| 2020/0111005 | A1* | 4/2020 | Ghosh | G06N 3/084 |
| 2020/0202171 | A1 | 6/2020 | Hughes et al. | |
| 2020/0272854 | A1 | 8/2020 | Caesar | |
| 2021/0295201 | A1* | 9/2021 | Kim | G06N 20/00 |
| 2022/0164602 | A1* | 5/2022 | Frtunikj | G06K 9/6257 |

OTHER PUBLICATIONS

Cai, S. et al., "Data Collection in Underwater Sensor Networks Based on Mobile Edge Computing", IEEE Access, (2019) vol. 7, pp. 65357-65367, available at https://ieeexplore.ieee.org/stamp/stamp.jsp?arnumber=8719985.

Dave, H., "Active Learning Sampling Strategies", available at https://towardsdatascience.com/active-learning-sampling-strategies-f8d8ac7037c8 accessed on Nov. 17, 2020.

Huang, H et al., "On the improvement of reinforcement active learning with the involvement of cross entropy to address one-shot learning problem" PLoS ONE (2019) 14(6): e0217408. available at https://journals.plos.org/plosone/article?id=10.1371/journal.pone.0217408.

Liu, S. et al., "Edge Computing for Autonomous Driving: Opportunities and Challenges", Proceedings of the IEEE, vol. 107, No. 8, Aug. 2019, available at http://weisong.eng.wayne.edu/_resources/pdfs/liu19-EdgeAV.pdf.

Nvidia AI, "Scalable Active Learning for Autonomous Driving", Dec. 18, 2019, available at https://medium.com/nvidia-ai/scalable-active-learning-for-autonomous-driving-a-practical-implementation-and-a-b-test-4d315ed04b5f accessed Nov. 17, 2020.

Wei, X., "Deep Active Learing for 3D Object Detection for Autonomous Driving", Degree Project in Computer Science and Engineering, Second Cycle, Stockholm, Sweden, Nov. 22, 2019, available at http://www.diva-portal.org/smash/get/diva2:1415945/FULLTEXT01.pdf.

Yoo, D. et al., "Learning Loss for Active Learning", arXiv:1905.03677 [cs.CV], May 9, 2019. available at: https://openaccess.thecvf.com/content_CVPR_2019/papers/Yoo_Learning_Loss_for_Active_Learning_CVPR_2019_paper.pdf.

International Search Report and Written Opinion dated Apr. 7, 2022, issued in International Application No. PCT/US2021/072897 (10 pages).

U.S. Appl. No. 17/124,413, filed Dec. 16, 2020, Autonomous Vehicle System for Intelligent On-Board Selection of Data for Training a Remote Machine Learning Model.

U.S. Appl. No. 17/101,633, filed Nov. 23, 2020, Systems and Methods for Intelligent Selection of Data for Building a Machine Learning Model.

* cited by examiner

AUTONOMOUS VEHICLE SYSTEM FOR INTELLIGENT ON-BOARD SELECTION OF DATA FOR BUILDING A REMOTE MACHINE LEARNING MODEL

BACKGROUND

It is important to the operation of autonomous vehicles to be able to predict or forecast object behavior that includes correctly detecting objects in the environment of the autonomous vehicle. Accurate forecasts of object behavior enable an autonomous vehicle to implement anticipatory planning and control rather than being reactive to its environment. This results in a more natural driving behavior by the autonomous vehicle as well as improved comfort and safety for its passengers.

Autonomous vehicles collect a large amount of data from numerous sensors in order to perform object detection and object behavior prediction. It is important to obtain real-world data regarding vehicle events that can be used to develop, evaluate, and/or test systems for vehicle control. However, real-world vehicle events of interest are sparse and difficult to isolate from continuously collected real-world data, because the total real-world datasets from driving sessions often contain redundancies and/or large quantities of irrelevant or less-relevant information as related to vehicle operations.

Typically, a passive learning method accepts randomly selected training data. However, such random selection of training data requires expensive labeling which might not improve the training of the machine learning model (e.g., when the randomly selected training data does not include useful information). In active learning, "useful" data is selected for subsequent training of a machine learning model, instead of passively accepting randomly selected data. Active learning can significantly reduce the amount of data required for training, test and/or validation of a machine learning model, compared to passive learning while achieving similar or better object detection (including classification as well as bounding box regression) accuracy as passive learning. However, current active learning methods do not take into account information about the environment of the autonomous vehicle in which it is operating and/or will operate during selection of data samples.

Furthermore, the real-world data is typically collected at the "edge" of the computational network (e.g., in the vehicle during driving), where computing power and storage is limited (e.g., by physical constraints, thermal constraints, power constraints, etc.), and often substantially processed and/or stored in the cloud (e.g., at a remote computing system), which may lead to latency and bandwidth related costs. However, active learning is also typically performed at the remote server, and it is often difficult for an autonomous vehicle to determine which images and/or information from which sources should be processed and used for training and labeling operations. It is desirable to meet accuracy requirements at the cloud computing, while balancing latency/cost requirements associated with computing edge.

This document describes methods and systems that are directed to addressing the problems described above, and/or other issues.

SUMMARY

In various scenarios, a systems and methods for on-board selection of data logs for training a machine learning model are disclosed. The system may include an autonomous vehicle having a plurality of sensors, a processor, and a non-transitory computer readable medium including programming instructions that when executed by the processor may cause the processor to execute the methods of this disclosure. The system may a plurality of unlabeled data logs from the plurality of sensors. The system may also receive a machine learning model and a loss function corresponding to the machine learning model (e.g., from a remote server). For each of the plurality of data logs, the system may then determine one or more predictions using the machine learning model, compute an importance function based on the loss function and the one or more predictions, and transmit that data log to a remote server for updating the machine learning model when a value of the importance function is greater than a threshold. Optionally, the system may discard that data log if the value of the importance function is less than the threshold.

In various implementations, the importance function may be a gradient based importance function computed with respect to a parameter of the machine learning model. Examples of the machine learning model utilizes a differentiable loss function (e.g., a neural network based model). Additionally and/or alternatively, the system may determine the loss function with respect to the parameter of the machine learning model based on all previously collected training data that was used to build the machine learning model. Optionally, the system may compute the importance function by taking a derivative of the loss function with respect to the parameter of the machine learning model for that data log. In various implementations, the threshold is selected such that when a data log having the value of the importance function that is greater than the threshold is used for updating the machine learning, the parameter of the machine learning model is updated in a direction of a gradient for that parameter. Optionally, the threshold may be determined empirically.

In certain implementations, the value of the importance function may be determined based on a confidence level associated with an output of the one or more predictions for that data log.

In some implementations, the machine learning model is an object detection model and the data log includes an image. In such scenarios, the system may determine the one or more predictions using the object detection model to detect an object in that image, and determine a bounding box and label corresponding to the detected object.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

A variety of algorithms for control and navigation of autonomous vehicles, such as object detection algorithms for detecting objects in images, use machine learning models that are built using labeled data (e.g., training data, test data, validation data, etc.). While such training such models require a large amount of training data (i.e., labeled images), it is not feasible to use all or majority of data collected by an autonomous vehicle because of processing, cost, memory and transmission constraints. Typically, a passive learning method accepts randomly selected training data and/or data collected from a dedicated data collection drive. However, such random selection of training data requires expensive labeling which might not improve the training of the machine learning model (e.g., when the randomly selected training data does not include useful information). In active learning, "useful" data (e.g., an image having a wrongly predicted label, or an uncertain prediction label, etc.) is selected for subsequent training of a machine learning model, instead of passively accepting randomly selected data. Active learning can significantly reduce the amount of training data required, compared to passive learning while achieving similar classification accuracy as passive learning.

Typically, passive and/or active learning algorithms are executed at a remote computing device and not at the data collection source (e.g., an autonomous vehicle that collects sensor data), and require storage and post-processing of massive amounts of data off-board before selection of useful training data. This also requires storing a larger amount of data onboard which may be redundant (and may be deleted at a later time) because the selection process of training data is not performed onboard the autonomous vehicle (in real-time and/or close to real-time).

Aspects of the current disclosure improve building—including training, test and/or validation—of machine learning models by intelligently selecting raw data samples (e.g., useful and/or important data) at the computing edge (i.e., the vehicle collecting sensor data) for subsequent storage, annotation and/or use in building a machine learning model at a remote server.

Figure 1:
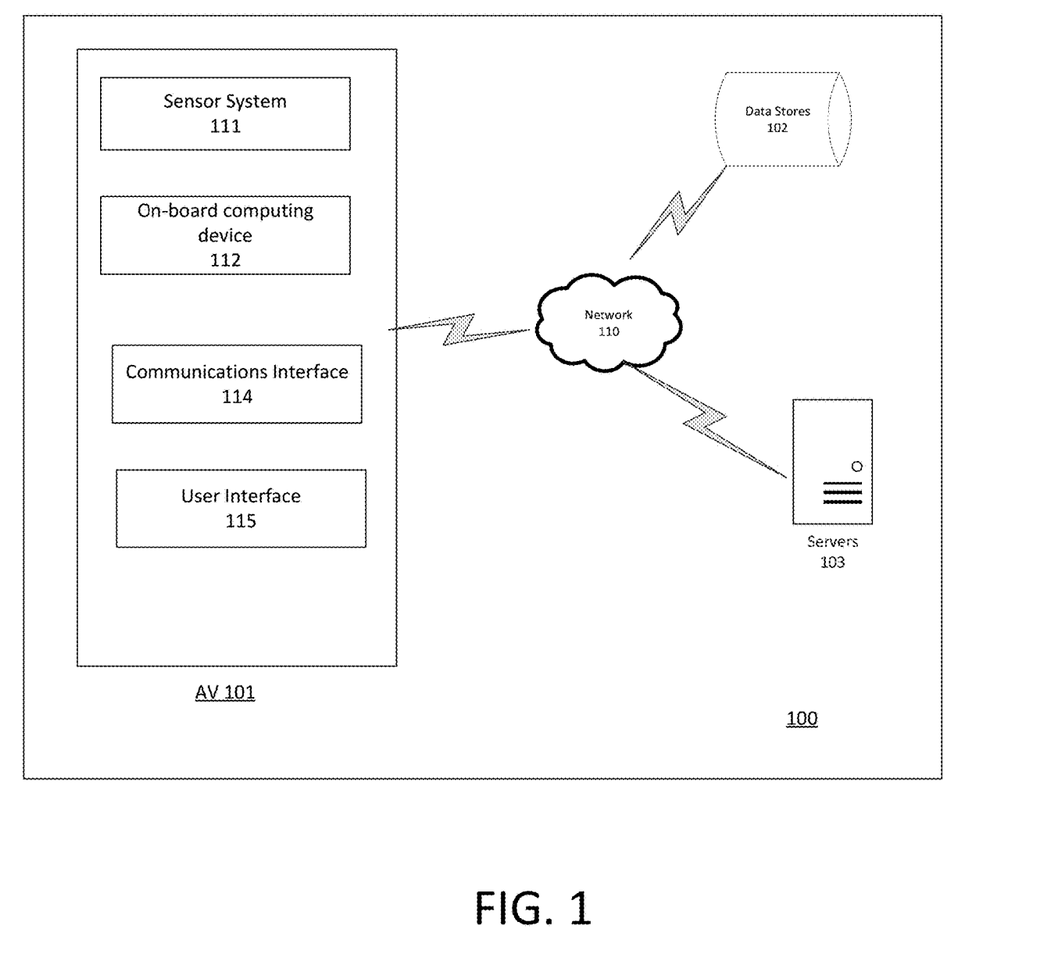
FIG. 1 is a block diagram illustrating an example autonomous vehicle system.

FIG. 1 is a block diagram illustrating an example system 100 that includes an autonomous vehicle 101 in communication with one or more data stores 102 and/or one or more servers 103 via a network 110. Although there is one autonomous vehicle shown, multiple autonomous vehicles may be communicatively coupled to each other and/or communicatively coupled to data stores 102 and/or servers 103 over network 110. Network 110 may be any type of network such as a local area network (LAN), a wide area network (WAN) such as the Internet, a cellular network, a satellite network, or a combination thereof, and may be wired or wireless. Data store(s) 102 may be any kind of data stores such as, without limitation, map data store(s), historical information data store(s), traffic information data store(s), user information data store(s), point of interest data store(s), or any other type of content data store(s). Server(s) 103 may be any kind of servers or a cluster of servers, such as, without limitation, Web or cloud servers, application servers, backend servers, or a combination thereof.

As illustrated in FIG. 1, the autonomous vehicle 101 may include a sensor system 111, an on-board computing device 112, a communications interface 114, and a user interface 115. Autonomous vehicle 101 may further include certain components (as illustrated, for example, in FIG. 2) included in vehicles, such as, an engine, wheels, steering wheel, transmission, etc., which may be controlled by the on-board computing device 112 using a variety of communication signals and/or commands, such as, for example, acceleration signals or commands, deceleration signals or commands, steering signals or commands, braking signals or commands, etc.

The sensor system 111 may include one or more sensors that are coupled to and/or are included within the autonomous vehicle 101 and that are configured for sensing or measuring properties of the autonomous vehicle's environment. Examples of such sensors include, without limitation, a LIDAR system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the autonomous vehicle 101, information about the environment itself, information about the motion of the autonomous vehicle 101, information about a route of the autonomous vehicle, or the like. As autonomous vehicle 101 travels over a surface, at least some of the sensors may collect data pertaining to the surface.

The LIDAR system may include a sensor configured to sense or detect objects in an environment in which the autonomous vehicle 101 is located using light. Generally, a LIDAR system is a device that incorporates optical remote sensing technology that can measure distance to, or other properties of, a target (e.g., a ground surface) by illuminating the target with light. As an example, the LIDAR system may include a laser source and/or laser scanner configured to emit laser pulses and a detector configured to receive reflections of the laser pulses. For example, the LIDAR system may include a laser range finder reflected by a rotating mirror, and the laser is scanned around a scene being digitized, in one, two, or more dimensions, gathering distance measurements at specified angle intervals. The LIDAR system, for example, may be configured to emit laser pulses as a beam, and scan the beam to generate two dimensional or three dimensional range matrices. In examples, the LIDAR system may include components such as light (e.g., laser) source, scanner and optics, photo-detector and receiver electronics, and position and navigation system. In an example, The LIDAR system may be configured to use ultraviolet (UV), visible, or infrared light to image objects and can be used with a wide range of targets, including non-metallic objects. In one example, a narrow laser beam can be used to map physical features of an object with high resolution. A field of view may be illuminated with a wide diverging laser beam in a single pulse and/or point-by-point.

Figure 2:
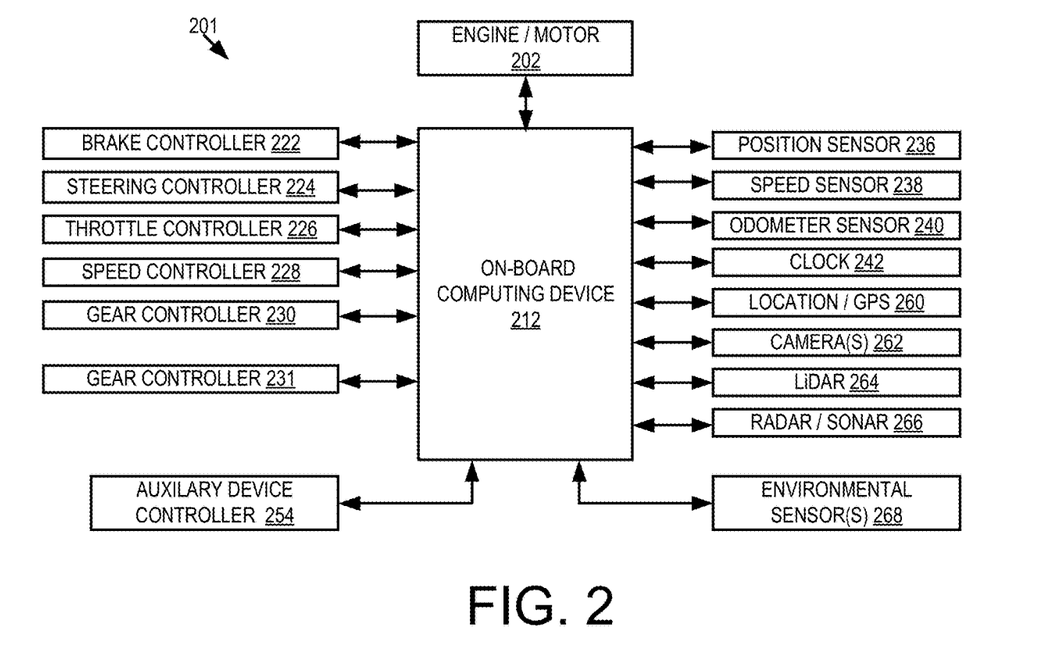
FIG. 2 illustrates an example vehicle controller system.

FIG. 2 illustrates an example system architecture for a vehicle 201, such as the autonomous vehicle 101 of FIG. 1 autonomous vehicle. The vehicle 201 may include an engine or motor 202 and various sensors for measuring various parameters of the vehicle and/or its environment. Operational parameter sensors that are common to both types of vehicles include, for example: a position sensor 236 such as an accelerometer, gyroscope and/or inertial measurement unit; a speed sensor 238; and an odometer sensor 240. The vehicle 201 also may have a clock 242 that the system architecture uses to determine vehicle time during operation. The clock 242 may be encoded into the vehicle on-board computing device 212, it may be a separate device, or multiple clocks may be available.

The vehicle 201 also may include various sensors that operate to gather information about the environment in which the vehicle is traveling. These sensors may include, for example: a location sensor 260 such as a GPS device; object detection sensors such as one or more cameras 262; a LiDAR sensor system 264; and/or a radar and or and/or a sonar system 266. The sensors also may include environmental sensors 268 such as a precipitation sensor and/or ambient temperature sensor. The object detection sensors may enable the vehicle 201 to detect objects that are within a given distance or range of the vehicle 201 in any direction, while the environmental sensors collect data about environmental conditions within the vehicle's area of travel. The system architecture will also include one or more cameras 262 for capturing images of the environment.

During operations, information is communicated from the sensors to an on-board computing device 212. The on-board computing device 212 analyzes the data captured by the sensors and optionally controls operations of the vehicle based on results of the analysis. For example, the on-board computing device 212 may control braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers such as an auxiliary device controller 214.

Geographic location information may be communicated from the location sensor 220 to the on-board computing device 212, which may then access a map of the environment that corresponds to the location information to determine known fixed features of the environment such as streets, buildings, stop signs and/or stop/go signals. Captured images from the cameras 262 and/or object detection information captured from sensors such as a LiDAR system 264 is communicated from those sensors) to the on-board computing device 212. The object detection information and/or captured images may be processed by the on-board computing device 212 to detect objects in proximity to the vehicle 201. In addition or alternatively, the vehicle 201 may transmit any of the data to a remote server system 103 (FIG. 1) for processing. Any known or to be known technique for making an object detection based on sensor data and/or captured images can be used in the embodiments disclosed in this document.

The on-board computing device 212 may obtain, retrieve, and/or create map data that provides detailed information about the surrounding environment of the autonomous vehicle 201. The on-board computing device 212 may also determine the location, orientation, pose, etc. of the AV in the environment (localization) based on, for example, three dimensional position data (e.g., data from a GPS), three dimensional orientation data, predicted locations, or the like. For example, the on-board computing device 212 may receive GPS data to determine the AV's latitude, longitude and/or altitude position. Other location sensors or systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location. The map data can provide information regarding: the identity and location of different roadways, road segments, lane segments, buildings, or other items; the location, boundaries, and directions of traffic lanes (e.g., the location and direction of a parking lane, a turning lane, a bicycle lane, or other lanes within a particular roadway) and metadata associated with traffic lanes; traffic control data (e.g., the location and instructions of signage, traffic lights, or other traffic control devices); and/or any other map data that provides information that assists the on-board computing device 212 in analyzing the surrounding environment of the autonomous vehicle 201. The map data may also include information and/or rules for determining right of way of objects and/or vehicles in conflicted areas or spaces.

In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on a historical observations of vehicles or other objects over a period of time (e.g., reference paths for straight line travel, lane merge, a turn, or the like).

In certain embodiments, the on-board computing device 212 may also include and/or may receive information relating to the trip or route of a user, real-time traffic information on the route, or the like.

The on-board computing device 212 may include and/or may be in communication with a routing controller 231 that generates a navigation route from a start position to a destination position for an autonomous vehicle. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost function during the route, and may further access the traffic information and/or estimates that can affect an amount of time it will take to travel on a particular route. Depending on implementation, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

In various implementations, an on-board computing device 212 may determine perception information of the surrounding environment of the autonomous vehicle 201. Based on the sensor data provided by one or more sensors and location information that is obtained, the on-board computing device 212 may determine perception information of the surrounding environment of the autonomous vehicle 201. The perception information may represent what an ordinary driver would perceive in the surrounding environment of a vehicle. The perception data may include information relating to one or more objects in the environment of the autonomous vehicle 201. For example, the on-board computing device 212 may process sensor data (e.g., LIDAR or RADAR data, camera images, etc.) in order to identify objects and/or features in the environment of autonomous vehicle 201. The objects may include traffic signals, road way boundaries, other vehicles, pedestrians, and/or obstacles, etc. The on-board computing device 212 may use any now or hereafter known object recognition or detection algorithms, video tracking algorithms, and computer vision algorithms (e.g., track objects frame-to-frame iteratively over a number of time periods) to determine the perception. In an embodiment, the on-board computing device 212 may include an object detector that detects and labels objects. An example object detector is a convolutional neural network (CNN). The object detector may output an image or point cloud that includes bounding boxes surrounding the detected objects, labels for the objects and/or bounding box scores that indicate a degree of confidence that the objects detected were correctly labeled.

In some embodiments, the on-board computing device 212 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information. As discussed below in more detail, the on-board computing device 212 may also identify a lane being occupied by an object at any given time.

The on-board computing device 212 may perform one or more prediction and/or forecasting operations. For example, the on-board computing device 212 may predict future locations, trajectories, and/or actions of one or more objects. For example, the on-board computing device 212 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the autonomous vehicle 201, the surrounding environment, and/or their relationship(s). For example, if an object is a vehicle and the current driving environment includes an intersection, the on-board computing device 212 may predict whether the object will likely move straight forward or make a turn. If the perception data indicates that the intersection has no traffic light, the on-board computing device 212 may also predict whether the vehicle may have to fully stop prior to enter the intersection.

The prediction and/or forecasting operations of the on-board computing device 212 can also be used to reduce the number of data samples (e.g., images) that require de novo object recognition to be performed, by tracking previously detected and/or classified objects between frames in a sequence of image frames. In some examples, object tracking can be performed via point tracking, such as by deterministic methods (e.g., with parametric constraints based on the object class of an object) or statistical methods (e.g., Kalman filtering). In some other examples, object tracking can be performed via kernel filtering and kernel tracking, such as using template-based methods or multi-view appearance methods. Optionally, object tracking can be performed via silhouette tracking, such as using shape matching, edge matching, and/or contour tracking. However, object tracking and trajectory prediction and/or determination can be determined using motion analysis or otherwise suitably performed via any suitable method or technique.

In various embodiments, the on-board computing device 212 may determine a motion plan for the autonomous vehicle. For example, the on-board computing device 212 may determine a motion plan for the autonomous vehicle based on the perception data and/or the prediction data. Specifically, given predictions about the future locations of proximate objects and other perception data, the on-board computing device 212 can determine a motion plan for the autonomous vehicle 201 that best navigates the autonomous vehicle relative to the objects at their future locations.

In one or more embodiments, the on-board computing device 212 may receive predictions and make a decision regarding how to handle objects in the environment of the autonomous vehicle 201. For example, for a particular object (e.g., a vehicle with a given speed, direction, turning angle, etc.), the on-board computing device 212 decides whether to overtake, yield, stop, and/or pass based on, for example, traffic conditions, map data, state of the autonomous vehicle, etc. Furthermore, the on-board computing device 212 also plans a path for the autonomous vehicle 201 to travel on a given route, as well as driving parameters (e.g., distance, speed, and/or turning angle). That is, for a given object, the on-board computing device 212 decides what to do with the object and determines how to do it. For example, for a given object, the on-board computing device 212 may decide to pass the object and may determine whether to pass on the left side or right side of the object (including motion parameters such as speed). The on-board computing device 212 may also assess the risk of a collision between a detected object and the autonomous vehicle 201. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 212 may execute one or more control instructions to perform a cautious maneuver (e.g., mildly slow down, accelerate, change lane, or swerve). In contrast, if the collision cannot be avoided, then the on-board computing device 212 may execute one or more control instructions for execution of an emergency maneuver (e.g., brake and/or change direction of travel).

For example, if the on-board computing device 212 determines that based on the object trajectory forecasts, an object is likely to break a right of way agreement with the autonomous vehicle, the on-board computing device 212 may determine a motion plan for the autonomous vehicle that avoids collision with such an object in a conflicted space.

As discussed above, planning and control data regarding the movement of the autonomous vehicle is generated for execution. The on-board computing device 212 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

In the various embodiments discussed in this document, the description may state that the vehicle or a controller included in the vehicle (e.g., in an on-board computing system) may implement programming instructions that cause the vehicle and/or a controller to make decisions and use the decisions to control operations of the vehicle.

However, the embodiments are not limited to this arrangement, as in various embodiments the analysis, decision making and or operational control may be handled in full or in part by other computing devices that are in electronic communication with the vehicle's on-board computing device and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Referring back to FIG. 1, the communications interface 114 may be configured to allow communication between autonomous vehicle 101 and external systems, such as, for example, external devices, sensors, other vehicles, servers, data stores, databases etc. Communications interface 114 may utilize any now or hereafter known protocols, protection schemes, encodings, formats, packaging, etc. such as, without limitation, Wi-Fi, an infrared link, Bluetooth, etc. User interface system 115 may be part of peripheral devices implemented within vehicle 101 including, for example, a keyword, a touch screen display device, a microphone, and a speaker, etc.

Figure 3:
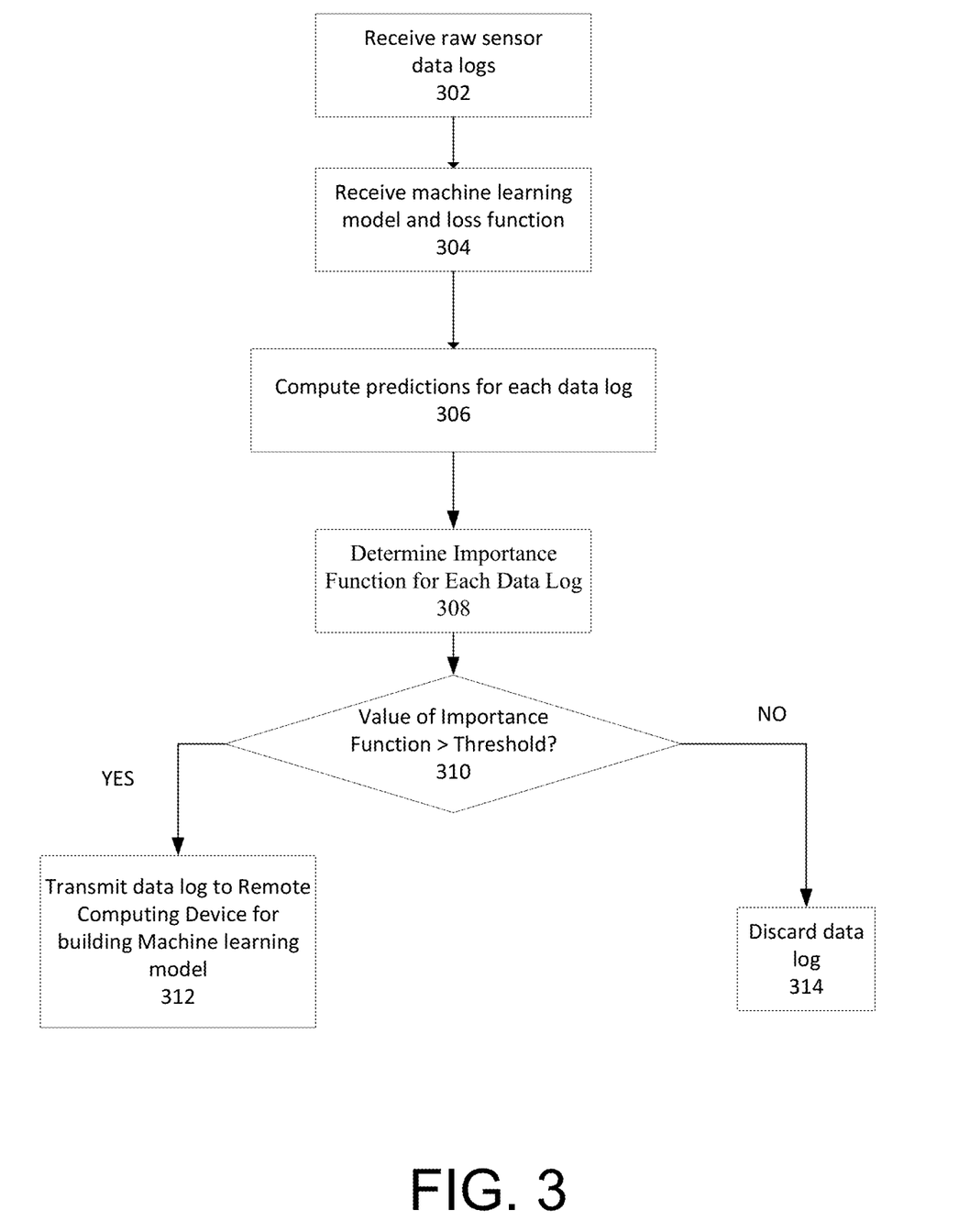
FIG. 3 illustrates a flow chart of an example method for intelligent on-board selection of data for training a remote machine learning model according to an embodiment.

Referring now to FIG. 3, a flowchart illustrating an example method for on-board selection of relevant data for subsequent transmission to a remote server and use in building a machine learning model. The method can be performed in real or near-real time (e.g., as the image data is recorded), after a delay, or at any suitable time. The method can be performed a predetermined number of times for a driving session, iteratively performed at a predetermined frequency for a driving session, or performed at any suitable time. Multiple instances of the method can be concurrently performed for multiple concurrent driving sessions (e.g., for different vehicles, via different vehicle systems). However, any suitable number of method instances can be performed at any suitable time. It should be noted that while the method describes selection of training data, the disclosure is not so limiting and similar principles can be used for selection of test data, validation data, or the like.

At 302, the on-board computing device of an autonomous vehicle may receive raw data logs from one or more sensors. The data logs may be gathered (e.g., recorded, obtained, etc.) at a vehicle system mounted to a vehicle during operation (e.g., driving). The received data logs are unlabeled. Examples of such raw data logs may include, without limitations, point clouds, 2D images, 3D images, audio logs, or the like. Data logs can include single data points (e.g., single images, single point cloud frames), data sequences (e.g., an image sequence, a video, bursts of point cloud frames, etc.), and/or any other suitable data sample. A single "log" of sensor data refers to data collected by a sensor over a contiguous time period "t". The data logs can include sensor measurement data in frames or scans over time, such as periodically, intermittently, in response to sensing events, or the like. Data logs data can be recorded constantly (e.g., continuously), periodically, randomly, upon occurrence of a trigger event (e.g., a driving event, a data value or signal exceeding a threshold value, etc.), and/or with any other suitable temporal characteristics.

At 304, the on-board computing device may receive a machine learning model for making predictions relating to the received data logs. For example, the machine learning model may be an example object detection model (e.g., a convolutional neural network (CNN), a mask R-CNN, etc.) that may be used to detect and label one or more objects and/or events in each received raw data log, output bounding boxes, or the like. In some embodiments, the on-board computing device may receive the machine learning model from a remote server. Optionally, the machine learning model (and related information such as the loss function discussed below) may be stored in a data store of the autonomous vehicle (e.g., at the time of manufacture, deployment, etc.). Other examples of machine learning models may include, without limitation, lane detection models, traffic light detection models, or the like. It should be noted that while the current disclosure describes neural network based models as example machine learning models, it is not so limiting and any now or hereafter known machine learning models (e.g., machine learning models that utilize a differentiable loss function) may be generated and/or updated using the principles of this disclosure.

The system may also receive a loss function associated with the received machine learning model trained using existing training data. Training of a machine learning model may include optimizing an objective function. Typically, the optimization procedure involves iteratively executing the model, and then differentiating the model (i.e., calculating the first derivative of each model parameter) to adapt the values of one or more model parameters to minimize or maximize the objective function. Optimizing an objective function may include, for example, minimizing a loss function. Generally, the loss function is a function that depends on the (i) output generated by the machine learning model upon processing of a given training data item, and (ii) the label for the training data item, i.e., the target output that the machine learning model should have generated by processing the training data item. The loss function may include penalties for misclassification, and the magnitude of the penalties increases with increasing deviation from the target output. The parameters of the machine learning model (e.g., a neural network model) are typically determined ("learned") using a method that minimizes the loss function. A machine learning model training system can train the machine learning model to minimize the (cumulative) loss function by performing multiple iterations of the machine learning model training techniques on a given training dataset (that includes hundreds, if not more, data samples) using, for example, stochastic gradient methods, stochastic gradient descent with backpropagation, or the like, to iteratively adjust the values of one or more parameters of the machine learning model. For example, in stochastic gradient descent, optimization is achieved iteratively by (a) finding analytical gradients for the loss functions and (b) perturbing or moving the test values by a small amount in the opposite direction of the gradient, until the loss function is minimized.

In an example implementation, the loss function for a parameter β may be represented as:

$$\sum_{i=1}^{n} L(y_i, ml_\beta(x_i | D))$$

where, $ml_\beta(x|D)$ is the machine learning model optimized for a parameter β, a raw input x such as an image or LIDAR point cloud, and a training data set D (e.g., a neural network based prediction method for output Y such as for a regression task, a classification task, or the like);

D represents the entire training dataset used to train the machine learning model;

$x_i$ represents a training data sample; and $y_i$ represents a target output corresponding to the training data sample $x_i$ when analyzed using the machine learning model.

Figure 4:
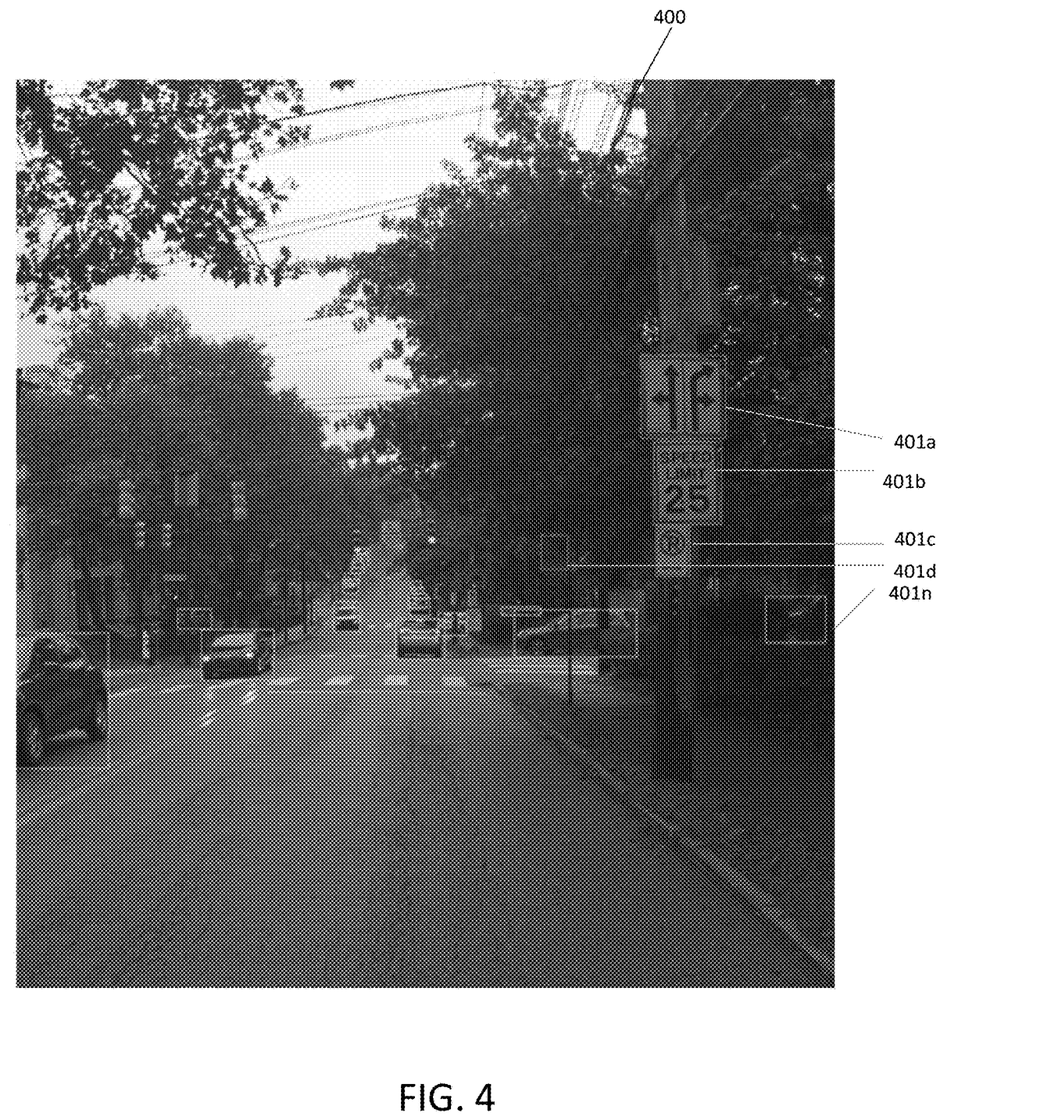
FIG. 4 is an example output image including bounding boxes with detected objects.

At 306, the on-board computing device may compute one or more predictions for each of the received data logs using the received machine learning model. For example, the on-board computing device may detect and label one or more objects and/or events in each received raw data log (e.g., point cloud, camera image, etc.) using a received object detection model. The object detection model may output an image or point cloud that includes bounding boxes surrounding the detected objects and/or labels for the objects. A bounding box indicates a region of the unlabeled data log that is believed to contain an identified object. Thus, the bounding box may be assigned a label indicating the identified object that is believed to be contained within the bounding box. Each detected object may be represented by its location (centroid or center point), boundary, label class, or even size. In an embodiment, the object detector can output an image or point cloud that includes bounding boxes surrounding the detected objects and/or labels for the detected objects. An example of an image 400 including bounding boxes 401a-n is shown in FIG. 4. As shown in FIG. 4, the bounding boxes include various detected objects such as vehicles, traffic signs, pedestrians, or the like.

The system may also identify a confidence score associated with each bounding box and/or identified label that indicates a degree of likelihood of the identified object being present in a portion of the unlabeled raw data enclosed by the bounding box or a degree of confidence that the object detected was correctly labeled. Specifically, the object detection model produces for each bounding box a confidence score which indicates a likelihood that the label assigned to the bounding box is correct (i.e., that the object associated with the label is depicted in the bounding box). The confidence score may be generated based on the object detection model's classification accuracy for the identified object/label. Optionally, the value of the confidence score may be from about 0.0 to about 1.0.

The on-board computing device may then determine (308) an importance function for each of the received data logs using the loss function and the prediction for that data log. The system may determine the importance function for a data log using, for example, stochastic gradient methods, stochastic gradient descent with backpropagation, or the like. It should be noted that unlike minimization of the loss function that computes a derivative of the loss function with respect to a parameter $\beta$ over the entire training dataset, the importance function is computed by taking a derivative of the loss function with respect to a parameter $\beta$ for a single input data log. For example, using a stochastic gradient descent function, an importance function may be determined as follows:

$$I(x) = \left\| E\left[ \frac{\partial}{\partial \beta_0} L(Y, ml_\beta(x \mid D)), \ldots, \frac{\partial}{\partial \beta_k} L(Y, ml_\beta(x \mid D)) \right] \right\|$$

where, $E[.]$ is a stochastic expectation operator; and $\|.\|$ is a norm (or a loss/cost function) that may be custom tailored for a specific use case (for example, for a type of machine learning model, a type of object class, a type of algorithm of the machine learning model, etc.). For example, this may be a standard $L_1$ norm, a standard $L_2$ norm, a specific norm that only applies to the parameters of one or more layers (e.g., last k layers) of a neural network of the machine learning model, or the like. As discussed, The importance function is a gradient of a loss function of a machine learning model at a specific data log, and may provide a measure of the data log's impact on the loss function during off board training of the model. Since the gradient may be multidimensional, the system may transform the multidimensional vector into a single scalar by taking the norm (i.e. distance to the origin) to measure the importance of the raw data log (as shown in the above equation).

The value of the importance function may be evaluated if, for example, the predicted probabilities of classes predicted for the data log (e.g., the confidence score for a bounding box discussed above, the conditional probability distribution, etc.) are used as conditional distribution of the output Y for that data log.

At 310, the system may determine whether the value of the importance function of a data log is greater than a threshold. If the importance score of the data log is greater than (or equal to) the threshold (110: YES), the on-board computing device may transmit the data log to a remote computing device for building (i.e., training, testing, validating, updating, etc.) a machine learning model (112). The system may transmit such data logs to the remote computing device periodically, immediately upon collection and processing of the data log, and/or occurrence of certain events (e.g., upon collection of a data collection drive). In certain embodiments, the system may temporarily store the data logs at an onboard data store (e.g., before processing to determine importance function; before occurrence of an event that causes transmission of the data log to the remote computing device, during periods between periodic transmission of the data log to the remote computing device, etc.).

The system may not transmit the data log to the remote server (114) if the importance score of the data log is less than the threshold (110: NO). Optionally, the system may discard data logs whose importance score is less than the threshold.

The value of the importance function may be determined to be greater than the threshold when the data log triggers a large gradient for a likely predicted outcome. Specifically, the threshold may be selected such that when an image having the value of the importance function that is greater than the threshold is used for updating the machine learning, the parameter of the machine learning model may be updated in a direction of a gradient for that parameter (i.e., the prediction accuracy or other performance of the updated machine learning model is better). The system may determine the threshold based on, for example, empirical calculations for different object classes, different machine learning models, machine learning model outputs, required accuracy, etc. Selection of a data log for building a machine learning model based on the importance function results in a machine learning model whose parameters (e.g., $\beta$) will likely be updated in the direction of the gradient for that parameter, without consumption of huge computation resources at the on-board computing device. It should be noted that computation and analysis of the importance function for a data log may have approximately a similar compute cost (in terms of computational power and resources used) to perform to the prediction step of 306 and can be performed by the on-board computing device (unlike computation and minimization of the loss function over the entire training dataset which typically cannot be performed by the on-board computing device).

Since there is too much sensor data to store in a practical on-board computing system of an autonomous vehicle, the active learning system disclosed herein helps reduce the amount of data logs stored in the on-board database, and to find a balance between quantity and quality of data logs in the database to optimize system performance and cost. To further enhance the performance at a global level, the present teaching discloses that an in situ computer aided perception system on each autonomous vehicle in a large fleet may automatically select appropriate useful data and transmit to a remote machine learning model building/update server. In this manner, hundreds of thousands sets of labeled data (generated while the vehicles are in operation) from diverse types of environment are consolidated at the remote machine learning model building/update server so that machine learning models can be updated based on a wide range of labeled data from diverse sources (and may be deployed back to the autonomous vehicles in the fleet). As such, fleet data present meaningful data related to a wide variety of perception conditions and situations, the global models can be trained and re-trained on a continuous basis to handle intended tasks in different conditions while optimizing data storage and transmission costs at an on-board computing device and/or the remote server.

While the above description relates to selection of raw or unlabeled images for subsequent labeling and for training a machine learning model that performs object detection, the disclosure is not so limiting. In particular, the methods and systems of this disclosure can be used for selection of any kind of raw data for training of many different kinds of models such as, without limitation, tracking models, motion planning models, forecasting models, prediction models, shape estimation models, pose estimation models, classification and labeling models, segmentation models, or the like.

Figure 5:
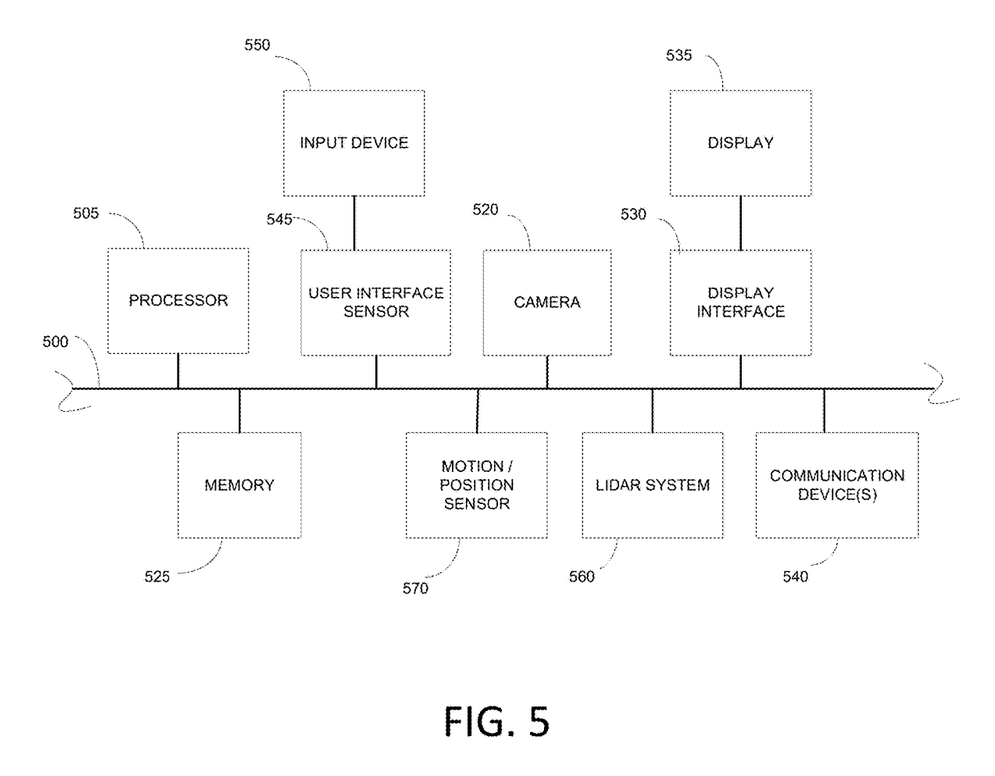
FIG. 5 is a block diagram that illustrates various elements of a possible electronic system, subsystem, controller and/or other component of an AV, and/or external electronic device.

FIG. 5 depicts an example of internal hardware that may be included in any of the electronic components of the system, such as internal processing systems of the AV, external monitoring and reporting systems, or remote servers. An electrical bus 500 serves as an information highway interconnecting the other illustrated components of the hardware. Processor 505 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 525. A memory device may include a single device or a collection of devices across which data and/or instructions are stored. Various embodiments of the invention may include a computer-readable medium containing programming instructions that are configured to cause one or more processors, and/or devices to perform the functions described in the context of the previous figures.

An optional display interface 530 may permit information from the bus 500 to be displayed on a display device 535 in visual, graphic or alphanumeric format, such on an in-dashboard display system of the vehicle. An audio interface and audio output (such as a speaker) also may be provided. Communication with external devices may occur using various communication devices 540 such as a wireless antenna, a radio frequency identification (RFID) tag and/or short-range or near-field communication transceiver, each of which may optionally communicatively connect with other components of the device via one or more communication system. The communication device(s) 540 may be configured to be communicatively connected to a communications network, such as the Internet, a local area network or a cellular telephone data network.

The hardware may also include a user interface sensor 545 that allows for receipt of data from input devices 550 such as a keyboard or keypad, a joystick, a touchscreen, a touch pad, a remote control, a pointing device and/or microphone. Digital image frames also may be received from a camera 520 that can capture video and/or still images. The system also may receive data from a motion and/or position sensor 570 such as an accelerometer, gyroscope or inertial measurement unit. The system also may receive data from a LiDAR system 560 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more physical hardware components that, in response to commands from the processor, can move with minimal or no human intervention. Through such movement, a robotic device may perform one or more automatic functions or function sets. Examples of such operations, functions or tasks may include without, limitation, operating wheels or propellers to effectuate driving, flying or other transportation actions, operating robotic lifts for loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

The term "machine learning model" or a "model" refers to a set of algorithmic routines and parameters that can predict an output(s) of a real-world process (e.g., prediction of an object trajectory, a diagnosis or treatment of a patient, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology.

A typical machine learning pipeline may include building a machine learning model from a sample dataset (referred to as a "training set"), evaluating the model against one or more additional sample datasets (referred to as a "validation set" and/or a "test set") to decide whether to keep the model and to benchmark how good the model is, and using the model in "production" to make predictions or decisions against live input data captured by an application service.

The term "bounding box" refers to a rectangular box that represents the location of an object. A bounding box may be represented in data by x- and y-axis coordinates $[x_{max}, y_{max}]$ that correspond to a first corner of the box (such as the upper right corner), along with x- and y-axis coordinates $[x_{max}, y_{max}]$ that correspond to the corner of the rectangle that is opposite the first corner (such as the lower left corner). It may be calculated as the smallest rectangle that contains all of the points of an object, optionally plus an additional space to allow for a margin of error. The points of the object may be those detected by one or more sensors, such as pixels of an image captured by a camera, or points of a point cloud captured by a LiDAR sensor.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" or "communicatively coupled" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The invention claimed is:

1. A method for active selection of data for training a machine learning model, comprising, by an on-board computing device of an autonomous vehicle:
   receiving, from a plurality of sensors of the autonomous vehicle, a plurality of unlabeled data logs;
   receiving, from a remote server:
      the machine learning model, and
      a loss function corresponding to the machine learning model; and
   for each of the plurality of unlabeled data logs:
      determining, using the machine learning model, one or more predictions for that data log,
      computing, based on the loss function and the one or more predictions for that data log, an importance function for that data log, and
      transmitting that data log to the remote server for updating the machine learning model when a value of the importance function is greater than a threshold.

2. The method of claim 1, wherein the importance function is a gradient based importance function computed with respect to a parameter of the machine learning model.

3. The method of claim 2, wherein the machine learning model utilizes a differentiable loss function.

4. The method of claim 2, further comprising determining the loss function with respect to the parameter of the machine learning model based on all previously collected training data that is used to build the machine learning model.

5. The method of claim 4, further comprising computing, based on the loss function and the one or more predictions for that data log, the importance function by taking a derivative of the loss function with respect to the parameter of the machine learning model for that data log.

6. The method of claim 5, further comprising determining the threshold such that use of a data log, having the value of the importance function that is greater than the threshold, for updating the machine learning model, causes the parameter of the machine learning model to be updated in a direction of a gradient for the parameter.

7. The method of claim 6, wherein the threshold is determined empirically.

8. The method of claim 5, wherein the value of the importance function is determined based on a confidence level associated with an output of the one or more predictions for that data log.

9. The method of claim 1, further comprising discarding that data log when the value of the importance function is less than the threshold.

10. The method of claim 1, wherein the machine learning model is an object detection model and that data log comprises an image.

11. The method of claim 10, wherein determining the one or more predictions comprises using the object detection model to:
   detect an object in the image; and
   determine a bounding box and label corresponding to the detected object.

12. A system for on-board selection of data logs for training a machine learning model comprising:
   an autonomous vehicle comprising:
      a plurality of sensors,
      a processor, and
      a non-transitory computer-readable medium comprising one or more programming instructions that when executed by the processor, will cause the processor to:
         receive, from the plurality of sensors, a plurality of unlabeled data logs,
         receive, from a remote server:
            the machine learning model, and
            a loss function corresponding to the machine learning model, and for each of the plurality of unlabeled data logs:
         determine, using the machine learning model, one or more predictions for that data log,
         compute, based on the loss function and the one or more predictions for that data log, an importance function for that data log, and
         transmit that data log to the remote server for updating the machine learning model when a value of the importance function is greater than a threshold.

13. The system of claim 12, wherein the importance function is a gradient based importance function computed with respect to a parameter of the machine learning model.

14. The system of claim 13, wherein the machine learning model utilizes a differentiable loss function.

15. The system of claim 13, further comprising programming instructions that when executed by the processor, will cause the processor to determine the loss function with respect to the parameter of the machine learning model based on all previously collected training data that is used to build the machine learning model.

16. The system of claim 15, further comprising programming instructions that when executed by the processor, will cause the processor to compute, based on the loss function and the one or more predictions for that data log, the importance function by taking a derivative of the loss function with respect to the parameter of the machine learning model for that data log.

17. The system of claim 16, further comprising programming instructions that when executed by the processor, will cause the processor to determine the threshold such that use of the data log, having the value of the importance function that is greater than the threshold, for updating the machine learning model, causes the parameter of the machine learning model to be updated in a direction of a gradient for the parameter.

18. The system of claim 17, wherein the threshold is determined empirically.

19. The system of claim 16, wherein the value of the importance function is determined based on a confidence level associated with an output of the one or more predictions for that data log.

20. The system of claim 12, further comprising programming instructions that when executed by the processor, will cause the processor to discard that data log when the value of the importance function is less than the threshold.

21. The system of claim 12, wherein the machine learning model is an object detection model and that data log comprises an image.

22. The system of claim 21, wherein the programming instructions that when executed by the processor, will cause the processor to determine the one or more predictions comprise programming instructions that when executed by the processor, will cause the processor to use the object detection model to:
   detect an object in the image; and
   determine a bounding box and label corresponding to the detected object.

* * * * *